United States Patent
Liu et al.

(10) Patent No.: US 10,685,942 B2
(45) Date of Patent: Jun. 16, 2020

(54) REFLECTION-CANCELING PACKAGE TRACE DESIGN

(71) Applicant: CREDO TECHNOLOGY GROUP LIMITED, Grand Cayman (KY)

(72) Inventors: Xike Liu, Shanghai (CN); Mengying Ma, Shanghai (CN)

(73) Assignee: Credo Technology Group Limited, Grand Cayman (KY)

( * ) Notice: Subject to any disclaimer, the term of this patent is extended or adjusted under 35 U.S.C. 154(b) by 0 days.

(21) Appl. No.: 16/453,128

(22) Filed: Jun. 26, 2019

(65) Prior Publication Data

US 2020/0020673 A1      Jan. 16, 2020

(30) Foreign Application Priority Data

Jul. 12, 2018   (CN) .......................... 2018 1 0765426

(51) Int. Cl.
| | |
|---|---|
| *H04W 72/04* | (2009.01) |
| *H01L 25/10* | (2006.01) |
| *H01L 23/00* | (2006.01) |
| *H01L 23/498* | (2006.01) |
| *H01L 23/66* | (2006.01) |

(Continued)

(52) U.S. Cl.
CPC ........ *H01L 25/105* (2013.01); *G06F 30/3312* (2020.01); *H01L 23/49816* (2013.01); *H01L 23/49827* (2013.01); *H01L 23/66* (2013.01); *H01L 24/16* (2013.01); *H01P 9/003* (2013.01); *H04B 1/40* (2013.01); *G06F 2119/12* (2020.01); *G06F 2119/18* (2020.01); *H01L 2223/6616* (2013.01); *H01L 2223/6627* (2013.01); *H01L 2224/16227* (2013.01); *H01L 2924/15311* (2013.01); *H01L 2924/30111* (2013.01);

(Continued)

(58) Field of Classification Search
USPC .......................................... 365/194; 455/509
See application file for complete search history.

(56) References Cited

U.S. PATENT DOCUMENTS

| | | |
|---|---|---|
| 6,879,456 B2 | 4/2005 | Leighton et al. |
| 9,258,155 B1 | 2/2016 | Riani et al. |

(Continued)

OTHER PUBLICATIONS

Shi, Hong, et al. "Advanced Packaging Technology and Die-Package-PCB Co-Design Jfor 56G NRZ FPGA." DesignCon 2018, Feb. 1, 2018, https://presentations.designcon.com/events/santa-clara/2018/conference.

*Primary Examiner* — Eva Y Puente
(74) *Attorney, Agent, or Firm* — Ramey & Schwaller LLP; Daniel Krueger

(57) ABSTRACT

A package trace design technique provides at least partial cancelation of reflections. In one illustrative method of providing a high-bandwidth chip-to-chip link with a first die coupled to a second die via a first substrate trace, an intermediate trace, and a second substrate trace, the method includes: (a) determining a first propagation delay for an electrical signal to traverse the first substrate trace, the electrical signal having a predetermined symbol interval; (b) determining a second propagation delay for the electrical signal to traverse the second substrate trace; and (c) setting a length for at least one of the first and second substrate traces, the length yielding a difference between the first and second propagation delays, the difference having a magnitude equal to half the predetermined symbol interval.

15 Claims, 4 Drawing Sheets

(51) Int. Cl.
*H01P 9/00* (2006.01)
*H04B 1/40* (2015.01)
*G06F 30/3312* (2020.01)
*G06F 119/12* (2020.01)
*G06F 119/18* (2020.01)

(52) U.S. Cl.
CPC .............. *H01L 2924/30205* (2013.01); *H04W 72/0446* (2013.01)

(56) References Cited

U.S. PATENT DOCUMENTS

| | | | |
|---|---|---|---|
| 2006/0056244 A1* | 3/2006 | Ware | G06F 1/10 365/194 |
| 2013/0079045 A1* | 3/2013 | Ma | H04W 52/16 455/509 |
| 2017/0311276 A1* | 10/2017 | Tsai | H04B 7/0617 |

* cited by examiner

REFLECTION-CANCELING PACKAGE TRACE DESIGN

BACKGROUND

Integrated circuits ("ICs") are incorporated into many electronic devices. To provide modularity and improved utility, ICs are routinely packaged to provide solderable terminals for connecting the IC to printed circuit boards of electronic devices, assemblies, and systems. The terminals are often integrated into a package substrate, which in turn provides leads or printed circuit traces connecting the terminals to electrodes or pads on the surface of the IC chip. Electrical connections between dies, package substrates, and printed circuit boards are often provided by solder bumps or solder balls, which may be arranged to form so-called ball grid arrays (BGA). For high-frequency signals traversing the interconnections between chips, signal propagation may be best understood using a transmission line model. In this model, the bumps and balls represent interfaces with small impedance mismatches that can create signal reflections and thereby introduce distortion into the conveyed signals.

Prior art attempts to address these reflections rely on active cancellation or equalization, which may undesirably increase circuit complexity, component count, and/or power consumption.

SUMMARY

Accordingly, there is disclosed herein a package trace design providing at least partial cancelation of reflections, as well as devices and methods employing the disclosed design principles. In one illustrative method of providing a high-bandwidth chip-to-chip link with a first die coupled to a second die via a first substrate trace, an intermediate trace, and a second substrate trace, the method includes: (a) determining a first propagation delay for an electrical signal to traverse the first substrate trace, the electrical signal having a predetermined symbol interval; (b) determining a second propagation delay for the electrical signal to traverse the second substrate trace; and (c) setting a length for at least one of the first and second substrate traces, the length yielding a difference between the first and second propagation delays, the difference having a magnitude equal to half the predetermined symbol interval.

An illustrative electronic assembly includes: a first die having a transmitter circuit; a second die having a receiver circuit; a first substrate trace electrically connected to the transmitter circuit; a second substrate trace electrically connected to the receiver circuit; and one or more intermediate traces electrically connected in series with the first and second substrate traces to convey a digital signal having a predetermined symbol interval. The first substrate trace and the second substrate trace respectively provide first and second propagation delays to the digital signal, the first and second propagation delays having a difference with a magnitude equal to one half of the predetermined symbol interval.

An illustrative packaged transceiver for serializer-deserializer (SerDes) communication with a remote transceiver, includes: a first die having a transmitter circuit that sends a SerDes data stream having a predetermined symbol interval; and a package substrate having a first substrate trace that couples the transmitter circuit to a package terminal. The terminal is configured to electrically connect to the remote transceiver via a printed circuit board trace, where the remote transceiver has a package substrate trace that couples the printed circuit board trace to a receiver circuit on a second die. The package substrate trace provides a predetermined propagation delay. The first substrate trace provides a first propagation delay, the first propagation delay and the predetermined propagation delay having a difference with a magnitude equal to one half of the symbol interval.

An illustrative non-transitory information storage medium has software that causes a computer to implement the illustrative method described above.

Each of the foregoing embodiments may be implemented individually or conjointly, and may be implemented with any one or more of the following features in any suitable combination: (1) manufacturing a substrate for packaging at least one of the first and second dies, the substrate having at least one of the first and second traces with said length. (2) assembling the link, wherein said assembling includes electrically connecting said at least one of the first and second traces to the intermediate trace. (3) said at least one of the first and second substrate traces is a longer substrate trace. (4) said setting includes extending the longer substrate trace. (5) the first die, the first substrate trace, the intermediate trace, the second substrate trace, and the second die, are electrically connected by balls or bumps that introduce impedance mismatches via capacitive coupling. (6) said first and second substrate traces include a shorter substrate trace and a longer substrate trace. (7) said setting includes setting a length for each of the shorter and longer substrate traces. (8) the impedance mismatches cause signal pulse reflections. (9) the signal pulse reflections align to cause a falling edge response of a first reflection to cancel a rising edge response of a second reflection. (10) the first die further includes a receiver circuit. (11) the package substrate further includes a second substrate trace that couples the receiver circuit to a second package terminal, the second substrate trace providing a second propagation delay equal to the predetermined propagation delay.

Figure 1:
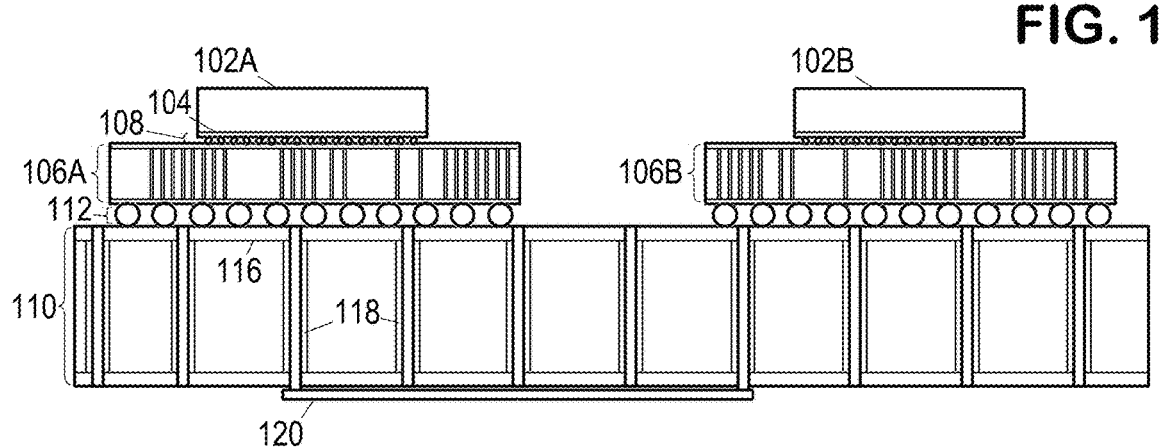
FIG. 1 is a partial cross-section of an illustrative microelectronic assembly.

It should be understood, however, that the specific embodiments given in the drawings and detailed description do not limit the disclosure. On the contrary, they provide the foundation for one of ordinary skill to discern the alternative forms, equivalents, and modifications that are encompassed in the scope of the appended claims.

NOMENCLATURE

Certain terms are used throughout the following description and claims to refer to particular system components and configurations. As one of ordinary skill will appreciate, companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or a direct electrical or physical connection. Thus, if a first device couples to a second device, that connection may be through a direct electrical connection, through an indirect electrical connection via other devices and connections, through a direct physical connection, or through an indirect physical connection via other devices and connections in various embodiments.

An integrated circuit ("IC") die is a diced unit of an IC wafer. (Herein, "dies" will be employed as the plural form of a die.) The packaged form of a singular IC die, with nodes, pins, posts, pads, terminals, leads, bumps, balls, or other electrical contacts (collectively referenced herein as "contacts") ready for soldering or other electrically-connected incorporation into a larger electrical circuit or system, may be termed an IC chip. The IC chips may in turn be attached directly to a circuit substrate, which can take the form of a laminated circuit board or a ceramic, glass, or semiconductor substrate, and generally has printed or etched traces. Such circuit substrates are encompassed by the term "printed circuit board" or "PCB".

DETAILED DESCRIPTION

The disclosed apparatus and methods are best understood in an illustrative context. Accordingly, FIG. 1 is a cross-section of an illustrative microelectronic assembly having IC die 102A with integrated circuitry 104 in a flip-chip configuration (i.e., with die substrate flipped to position the patterned areas and contacts adjacent to the mounting surface) attached to upper contacts of a package substrate 106A by micro bumps, or alternatively, by C4 ("Controlled Collapse Chip Connection") bumps 108. IC die 102B is similarly attached to a separate package substrate 106B. The lower contacts of each package substrate 106A, 106B are attached to the upper contacts of a printed circuit board (PCB) 110 by, e.g., a ball grid array (BGA) 112 having solder balls that electrically connect contacts arranged in a grid pattern. TSVs (through-silicon vias) 118 penetrate the package substrate to enable electrical connections between the patterned metal layers on the upper surface and patterned metal layers on the lower surface. The patterned metal layers on the lower surface include the substrate's lower contacts, to which the BGA balls attach. Interconnects on the dies, the package substrates, and the PCB (including printed circuit traces 116, 120, and vias 118) electrically connect the various components of the microelectronic assembly.

Figure 2A:
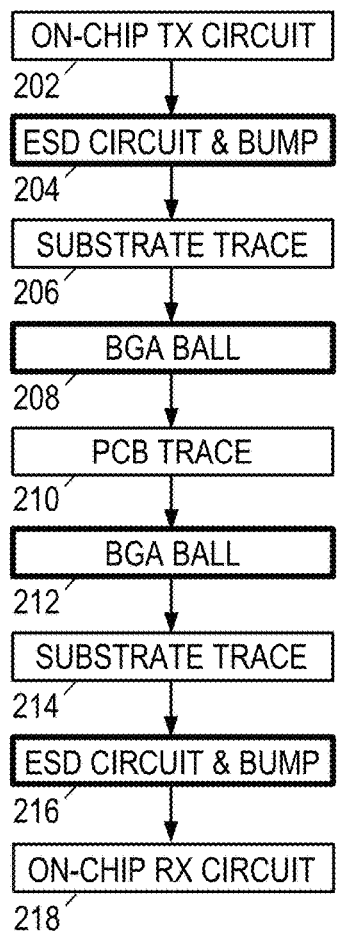
FIG. 2A is an illustrative element sequence along an interconnection.

FIG. 2A illustrates a sequence of elements that can be found along an illustrative high-bandwidth chip-to-chip connection such as that which could be employed for digital communication between serializer-deserializer (SerDes) modules on dies 102A, 102B. Thus, die 102A may include an on-chip transmitter 202. A solder bump, closely coupled to a protective electrostatic discharge (ESD) circuit 204, couples the transmitter 202 to substrate trace 206. A solder ball 208 in turn couples the substrate trace to a PCB trace 210. A second solder ball 212 couples the PCB trace 210 to a second substrate trace 214, and a second solder bump with protective ESD circuit 216 couples the second substrate trace 214 to an on-chip receiver 218.

The ESD circuits 204, 216 typically comprise diodes having a capacitive characteristic. The bumps and balls 208, 212 connect to electrodes or pads that exhibit capacitive coupling to ground planes and other conductive surfaces in the proximity. Thus blocks 204, 208, 212, and 216 represent points where the impedance of the conductive path fails to match the impedance for signals conveyed by traces on the substrates and PCB. Such impedance mismatches tend to cause reflections of propagating signals.

Figure 2B:
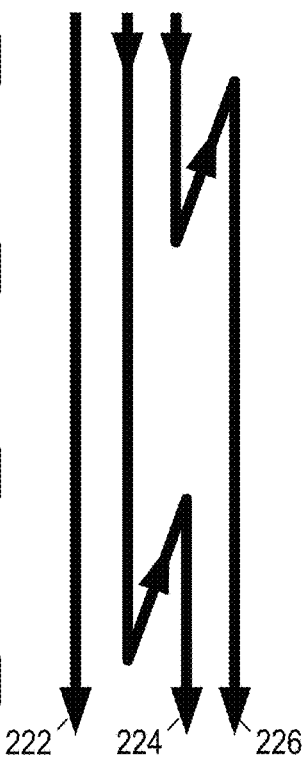
FIG. 2B is a set of illustrative signal propagation paths.

FIG. 2B shows examples of the paths that the energy of a propagating signal may follow as it traverses the connection between transmitter 202 and receiver 218. Path 222 represents the "straight through" path of signal energy that propagates without reflection. (In truth, most of the signal energy may be expected to follow path 222.) Where the propagation time along substrate trace 206, PCB trace 210, and substrate trace 214 are respectively, $t_1$, $t_2$, $t_3$, the propagation delay for path 222 is $t_1+t_2+t_3$.

Path 224 represents signal energy that reflects from block 216 and travels back through substrate trace 214 to reflect again from solder ball 212, retraversing the substrate trace 214 to reach the receiver 218. The propagation delay for path 224 is $t_1+t_2+3t_3$. Path 226 represents signal energy that reflects from solder ball 208, retraversing substrate trace 206 to block 204 and back again before traveling to the receiver 218. The propagation delay for path 226 is $3t_1+t_2+t_3$. Paths 222-226 show only three of the many ways that signal energy can travel from the transmitter to the receiver, but given the length disparity between package substrate traces and typical printed circuit board traces, the other ways are expected to have negligible effect in most cases.

Figure 3:
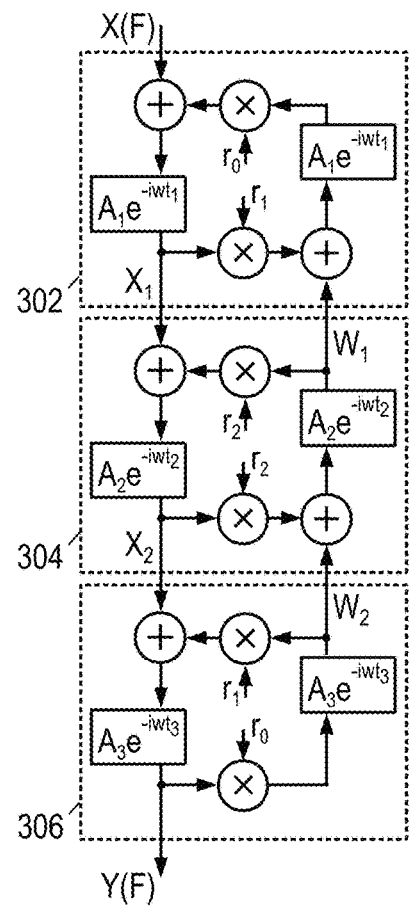
FIG. 3 is an illustrative signal propagation model.

FIG. 3 shows a frequency-domain model for the path traversed by the signal energy, with a first block 302 representing substrate trace 206 with its partially reflective ends, a second block 304 representing PCB trace 210 with its partially reflective ends, and a third block 306 representing substrate trace 214 with its partially reflective ends. Parameters $A_i$ and $t_i$ represent the attenuation and propagation delay associated with each traversal of the trace to which the block responds. From this model, the transfer function of the connection can be derived and used to determine the values of $t_1$ and/or $t_3$ that offer optimal cancelation of reflected signal energy. As will now be explained in detail, it is beneficial to account for signal timing when determining the optimal values of these parameters.

Figure 4A:
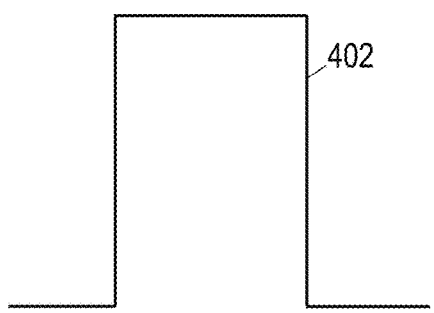
FIG. 4A is an illustrative signal pulse.
Figure 4B:
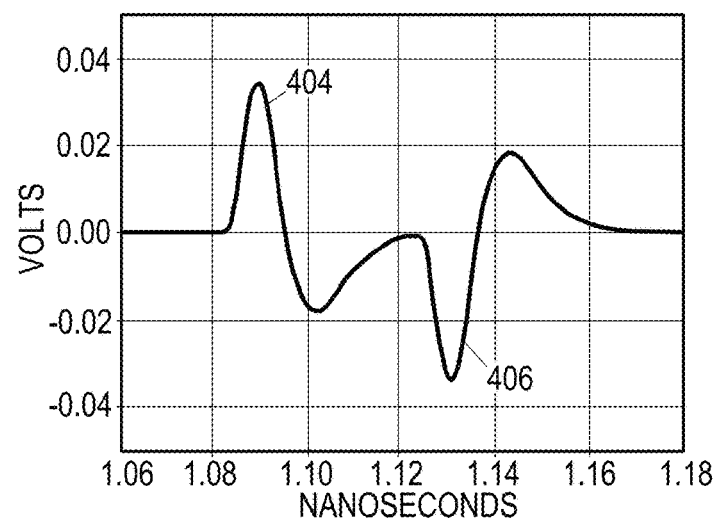
FIG. 4B is an illustrative pulse reflection response.

FIG. 4A is a square pulse 402 representing a bit or symbol that may be transmitted over the connection. Illustratively, it may have a height of 0.5 volts and pulse width (also referred to herein as a "symbol interval") of 40 picoseconds. FIG. 4B shows an example of a reflection that may be received by the receiver in response to such a pulse, e.g. via path 224 or 226. Notably, the reflection includes a rising edge response 404 and a falling edge response 406 which are the opposite polarity of each other.

Figure 4C:
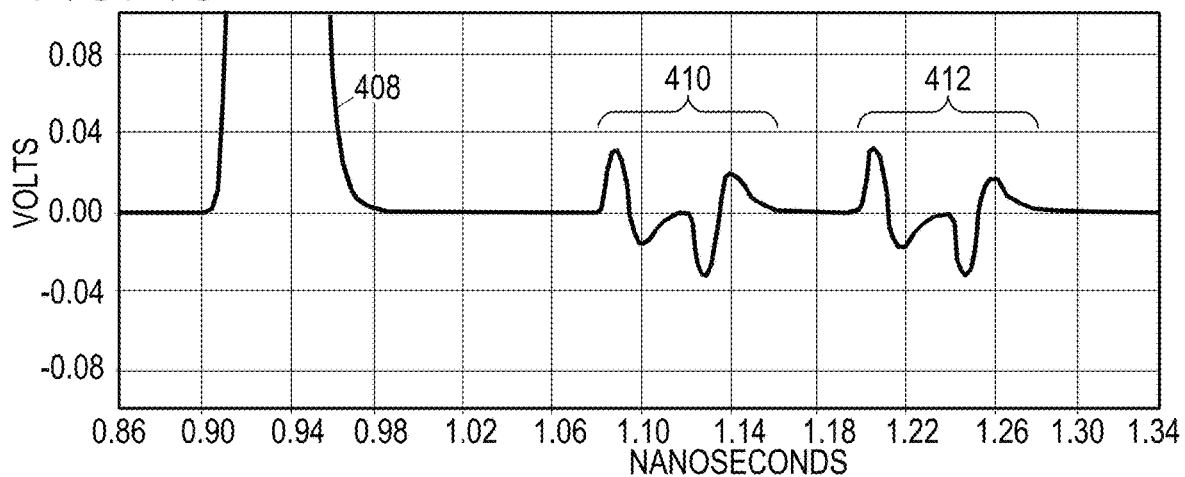
FIG. 4C is an illustrative multi-reflection response.

FIG. 4C is an illustrative graph of the connection's pulse response, including the initial pulse response 408 as well as a first reflection 410 and a second reflection 412. In the example used here, reflection 410 is provided by path 224 and reflection 412 is provided by path 226, but the correspondence could be reversed by interchanging the associated propagation delays $t_i$. Because the capacitive loading of block 204 and 216 may be expected to be similar, as also the solder balls 208, 212, the respective reflection coefficients are similar, making the reflections from the different paths nearly identical.

Figure 4D:
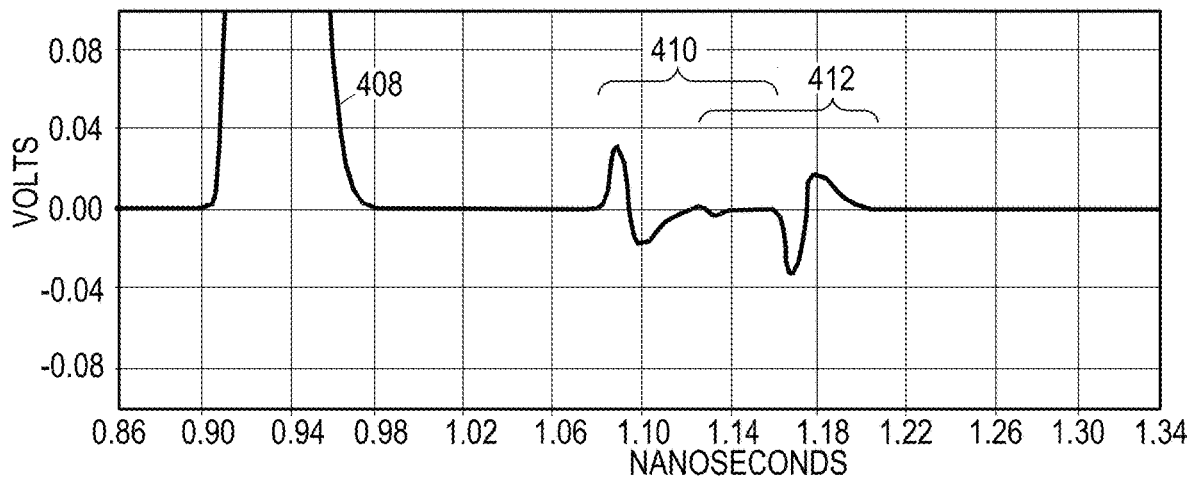
FIG. 4D is an illustrative reflection-cancelling response.

The reflections 410, 412 are separated, each causing intersymbol interference with later-transmitted symbols. However, as shown in FIG. 4D, suitable timing of the reflections causes portions of the reflections with opposite polarity to overlap. The resulting partial cancellation reduces the amount of intersymbol interference experienced by later-transmitted symbols and reduces the equalization needed to obtain a given bit error rate.

The difference between travel times for paths 224 and 226 is $2(t_3-t_1)$. If this difference is zero, the reflections will add constructively, significantly worsening the ISI. If this difference equals the pulse width, the falling edge response of the first-arriving reflection is canceled by the rising edge response of the second reflection, significantly reducing the ISI.

The difference between travel times for paths 224 and 222 is $2t_3$. Similarly, the difference between the travel times for paths 226 and 222 is $2t_1$. Thus reflections 410, 412 arrive $2t_1$ and $2t_3$ after the initial pulse response 408, and are preferably separated by one symbol interval to obtain the partial cancellation identified above.

Figure 5:
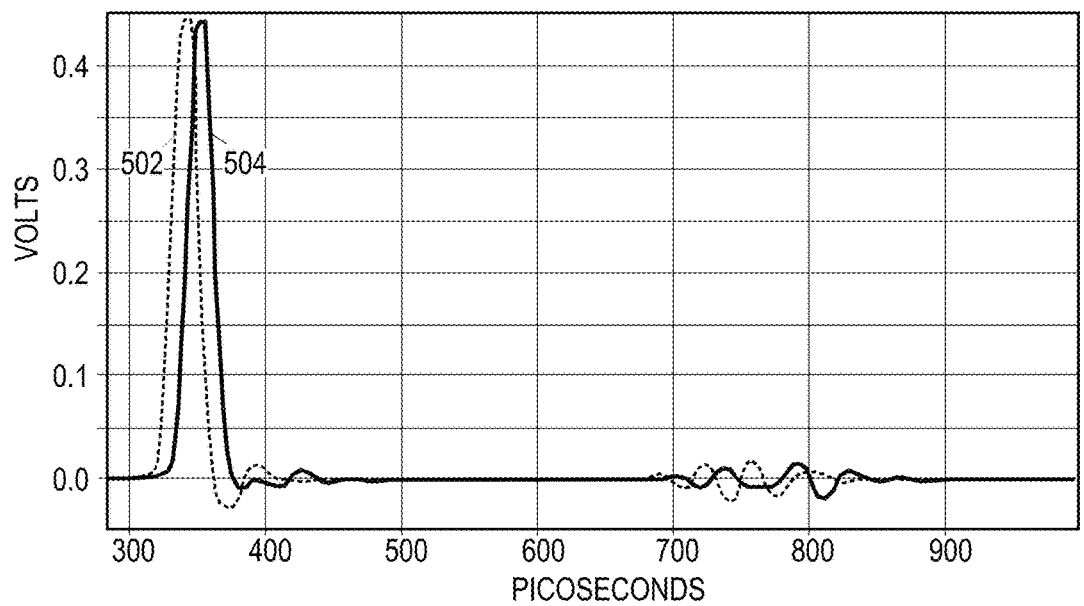
FIG. 5 is a graph of original and optimized pulse responses.

To provide another example, a simulation was performed using a 0.5 volt pulse having a 17.9 picosecond pulse width. The original length of the package trace for the transmit chip was 2158 micrometers and the package trace length for the receive chip was 2650 micrometers. (Propagation velocity is set at $1.63 \times 10^8$ m/s.) FIG. 5 shows the original pulse response 502. To provide partial cancellation, the package trace for the transmit chip was increased to 4128 micrometers to provide a full symbol interval between the reflections. The optimized pulse response 504 is also shown in FIG. 5 for comparison. Note that there is a significant reduction in ISI. (Shape differences relative to the earlier examples are attributable to the smaller pulse width and the bandwidth limitations of the connection.)

Figure 6A:
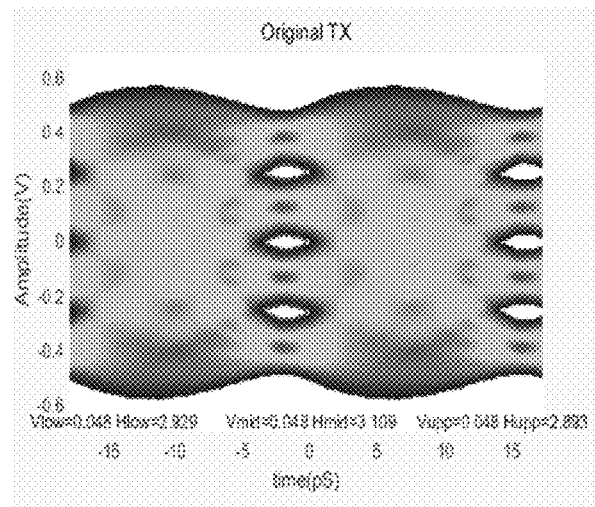
FIG. 6A is an illustrative eye diagram without reflection cancellation.
Figure 6B:
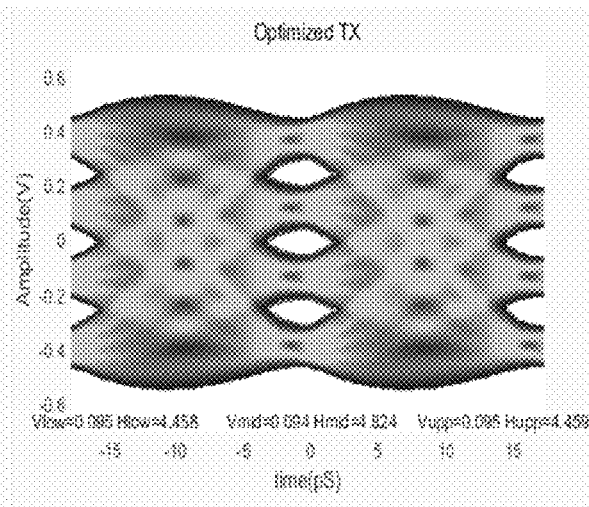
FIG. 6B is an illustrative eye diagram with reflection cancellation.

This reduction becomes even more apparent from a comparison of the eye diagrams. FIG. 6A is the original eye diagram for a 112 Gbps PAM4 signal and FIG. 6B is the eye diagram with the optimized reflection timing. Though the signal experiences a slightly greater attenuation due to the longer propagation distance, the sampling eyes are substantially larger, with the vertical and horizontal span of each eye increasing from about 48 mV and 2.9 ps to about 95 mV and 4.5 ps. The larger eye openings reduce the probability of a symbol error, thereby enabling enhanced system performance and/or reduced-complexity equalization to cancel ISI after digitization of the signal.

Figure 7:
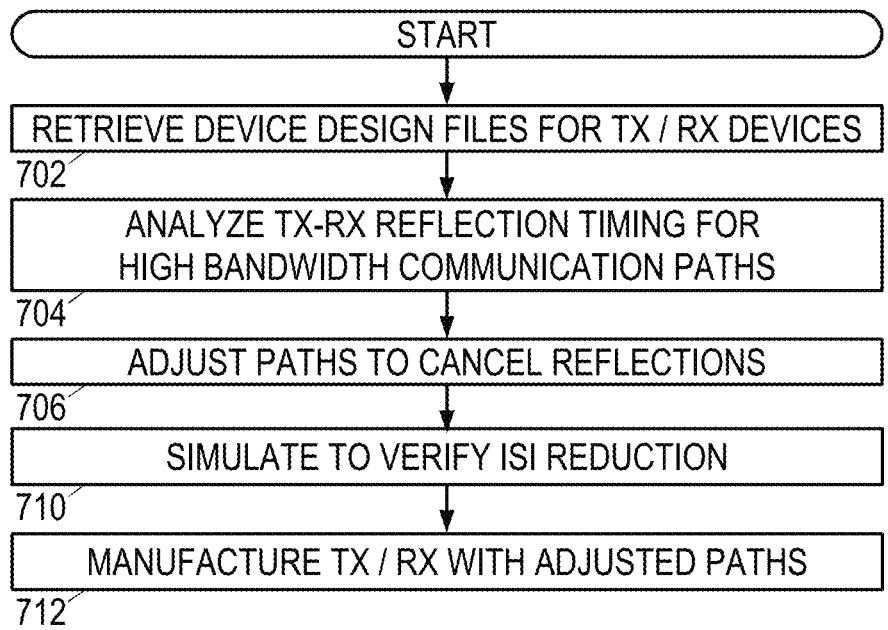
FIG. 7 is an illustrative manufacturing method.

FIG. 7 is a flow diagram of an illustrative manufacturing method employing the foregoing principles. The method may be implemented using software on a general purpose computer, firmware on an embedded system, field-programmable gate arrays, and/or application specific hardware. In block 702, the design files for the packaged chips that are intended to perform high bandwidth chip-to-chip communications with each other. In block 704, the design files are analyzed to determine the length and timing of the internal package traces for the high bandwidth connections. In particular, the timing difference value $2(t_1-t_3)$ is determined, corresponding to the reflection arrivals relative to each other. These values may be determined for each high bandwidth connection.

In block 706, it is determined whether the magnitude of $2(t_1-t_3)$ corresponds to a symbol interval of the signal that the high bandwidth connection is intended to transport. If not, the length of the package trace on the transmit side, or the package trace on the receive side, may be adjusted to set the magnitude of $2(t_1-t_3)$ equal to a symbol interval. As most designs automatically provide for minimum-length package traces, the adjustment would typically involve lengthening one or the other of the package traces to achieve the partial cancellation discussed previously. For example, the longer of the two package traces may be extended to achieve the desired spacing of reflections.

In block 710, the high bandwidth connection is simulated with the optimized package trace lengths to verify that reflection ISI has been sufficiently reduced. Thereafter, the design files are updated with the optimized package trace lengths and used to manufacture transmitter and receiver chips that provide enhanced performance over their high bandwidth chip-to-chip connections.

Figure 8:
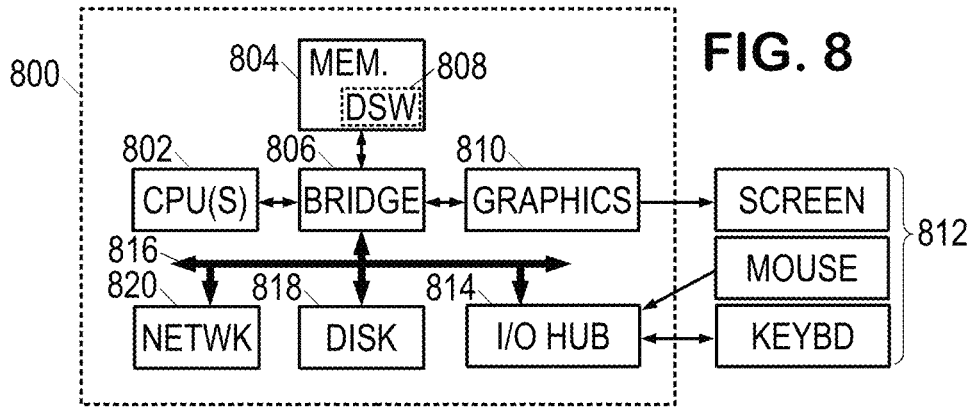
FIG. 8 is an illustrative device design system.

FIG. 8 is a block diagram of an illustrative system 800 for microelectronic assembly design. System 800 includes one or more central processing units (CPUs) 802 coupled to a system memory 804 by a bridge module 806. The bridge module 806 further enables the one or more CPUs 802 to communicate with a graphics processor 810 that drives the display portion of user interface 812. The bridge module 806 also supports communications of the CPUs 802 and system memory 804 with various peripherals via an input/output (I/O) bus 816. External peripherals such as keyboard and mouse or touchscreen components of interface 812 are coupled to the I/O bus 816 by an I/O hub 814. Internal peripherals, such as a disk drive or other persistent information storage device 818 and a wired or wireless network interface 820, may be directly coupled to the I/O bus 816.

Upon powering-up of the system 800, the CPUs 802 may retrieve operating system (OS) components and other software modules from disk 818 and store them in system memory 804 (i.e., "load the software") for execution. Alternatively, the CPUs 802 may load and execute some software modules in response to actions or commands received via the user interface 812. In accordance with the methods discussed further below, the loaded software may include microelectronic assembly design software (DSW) 808, shown in FIG. 8 as being resident in system memory 804. DSW module 808, when executed by one or more of the CPUs 802, causes them to implement a microelectronic assembly design method using the principles disclosed herein, such as the method shown in FIG. 7.

The foregoing principles have been discussed in a specific context for explanatory purposes. However, the reader will recognize that they are applicable in a much wider range of contexts. Numerous alternative forms, equivalents, and modifications will become apparent to those skilled in the art once the above disclosure is fully appreciated. For example, the foregoing description focuses on high bandwidth point to point communications over traces on package substrates but can be readily adapted for multi-point bus communications traces on dies, package substrates, and PCBs. While IC dies have been described as transmitter or receiver IC dies, it is possible for a given IC die to be both a transmitter and a receiver IC die, or for a package substrate to have a transmitter trace for sending a first high-bandwidth signal to a destination and a receiver trace for receiving a second high-bandwidth signal from a source, where the source and destination are expected to have corresponding package substrate traces for transmitting and receiving. It is intended that the claims be interpreted to embrace all such alternative forms, equivalents, and modifications that are encompassed in the scope of the appended claims.

What is claimed is:

1. A method of providing a high-bandwidth chip-to-chip link having a first die coupled to a second die via a first substrate trace, an intermediate trace, and a second substrate trace, the method comprising:
   determining a first propagation delay for an electrical signal to traverse the first substrate trace, the electrical signal having a predetermined symbol interval;
   determining a second propagation delay for the electrical signal to traverse the second substrate trace; and
   setting a length for at least one of the first and second substrate traces, the length yielding a difference between the first and second propagation delays, the difference having a magnitude equal to half the predetermined symbol interval.

2. The method of claim 1, further comprising:
   manufacturing a substrate for packaging at least one of the first and second dies, the substrate having at least one of the first and second traces with said length.

3. The method of claim 2, further comprising:
   assembling the link, wherein said assembling includes electrically connecting said at least one of the first and second traces to the intermediate trace.

4. The method of claim 1, wherein said at least one of the first and second substrate traces is a longer substrate trace, and wherein said setting includes extending the longer substrate trace.

5. The method of claim 1, wherein the first die, the first substrate trace, the intermediate trace, the second substrate trace, and the second die, are electrically connected by balls or bumps that introduce impedance mismatches via capacitive coupling.

6. The method of claim 5, wherein said first and second substrate traces comprise a shorter substrate trace and a longer substrate trace, and wherein said setting includes setting a length for each of the shorter and longer substrate traces.

7. An electronic assembly that comprises:
   a first die having a transmitter circuit;
   a second die having a receiver circuit;
   a first substrate trace electrically connected to the transmitter circuit;
   a second substrate trace electrically connected to the receiver circuit; and
   one or more intermediate traces electrically connected in series with the first and second substrate traces to convey a digital signal having a predetermined symbol interval,
   the first substrate trace and the second substrate trace respectively providing first and second propagation delays to the digital signal, the first and second propagation delays having a difference with a magnitude equal to one half of the predetermined symbol interval.

8. The electronic assembly of claim 7, wherein the first die, first substrate trace, one or more intermediate traces, second substrate trace, and second die are electrically connected by balls or bumps that introduce impedance mismatches via capacitive coupling.

9. The electronic assembly of claim 8, wherein the impedance mismatches cause signal pulse reflections, and wherein the signal pulse reflections align to cause a falling edge response of a first reflection to cancel a rising edge response of a second reflection.

10. A packaged transceiver for serializer-deserializer (SerDes) communication with a remote transceiver, the packaged transceiver comprising:
    a first die having a transmitter circuit that sends a SerDes data stream having a predetermined symbol interval;
    a package substrate having a first substrate trace that couples the transmitter circuit to a package terminal, the terminal configured to electrically connect to the remote transceiver via a printed circuit board trace, the remote transceiver having a package substrate trace that couples the printed circuit board trace to a receiver circuit on a second die, the package substrate trace providing a predetermined propagation delay,
    wherein the first substrate trace provides a first propagation delay, the first propagation delay and the predetermined propagation delay having a difference with a magnitude equal to one half of the symbol interval.

11. The packaged transceiver of claim 10, wherein the first die further comprises a receiver circuit, wherein the package substrate further includes a second substrate trace that couples the receiver circuit to a second package terminal, the second substrate trace providing a second propagation delay equal to the predetermined propagation delay.

12. The packaged transceiver of claim 10, wherein the first substrate trace couples to the transmitter circuit and to the printed circuit board trace via solder balls or bumps causing an impedance mismatch that produces a rising edge reflection response.

13. A non-transitory information storage medium having software that causes a computer to implement a method comprising:
    determining a first propagation delay for an electrical signal to traverse the first substrate trace, the electrical signal having a predetermined symbol interval;
    determining a second propagation delay for the electrical signal to traverse the second substrate trace; and
    setting a length for at least one of the first and second substrate traces, the length yielding a difference between the first and second propagation delays, the difference having a magnitude equal to half the predetermined symbol interval.

14. The medium of claim 13, wherein said at least one of the first and second substrate traces is a longer substrate trace, and wherein said setting includes extending the longer substrate trace.

15. The medium of claim 13, wherein said first and second substrate traces comprise a shorter substrate trace and a longer substrate trace, and wherein said setting includes setting a length for each of the shorter and longer substrate traces.

* * * * *